US006532760B2

(12) United States Patent
Davis

(10) Patent No.: US 6,532,760 B2
(45) Date of Patent: *Mar. 18, 2003

(54) METHOD AND APPARATUS FOR DISINFECTING A WATER COOLER RESERVOIR

(75) Inventor: Kenneth A. Davis, Metairie, LA (US)

(73) Assignee: S.I.P. Technologies, L.L.C., Mandeville, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/954,849

(22) Filed: Sep. 18, 2001

(65) Prior Publication Data

US 2002/0069664 A1 Jun. 13, 2002

Related U.S. Application Data

(63) Continuation-in-part of application No. 09/472,320, filed on Dec. 23, 1999, now Pat. No. 6,289,690, which is a continuation-in-part of application No. 09/220,554, filed on Dec. 23, 1998, now Pat. No. 6,085,540.

(51) Int. Cl.[7] .................................................. B67D 5/62
(52) U.S. Cl. ......................................... 62/392; 210/760
(58) Field of Search ........................... 62/157, 158, 392, 62/318, 389; 261/122.1, 76, 77, 124; 210/139, 192, 760

(56) References Cited

U.S. PATENT DOCUMENTS

| 2,947,525 A | 8/1960 | Klein |
| 3,448,045 A | 6/1969 | Hess et al. |
| 3,692,180 A | 9/1972 | Laraus |
| 3,726,404 A | 4/1973 | Troglione |
| 3,970,431 A | 7/1976 | Oksmon |
| 4,019,986 A | 4/1977 | Burris et al. |
| 4,842,723 A | 6/1989 | Parks et al. |
| 5,106,495 A | 4/1992 | Hughes |
| 5,328,059 A | 7/1994 | Campbell |
| 5,567,332 A | 10/1996 | Mehta |
| 5,582,717 A | 12/1996 | Di Santo |
| 5,587,089 A | 12/1996 | Vogel et al. |
| 5,632,268 A | 5/1997 | Ellis et al. |
| 5,669,221 A | 9/1997 | Lebleu et al. |

FOREIGN PATENT DOCUMENTS

| EP | 0 163 750 | 6/1984 |
| EP | 0 739 312 B1 | 1/1999 |
| WO | WO/88/04279 | 6/1987 |
| WO | WO/92/04969 | 11/1991 |
| WO | WO 93/17725 | 3/1993 |
| WO | WO 97/42924 | 5/1997 |

*Primary Examiner*—Chen Wen Jiang
(74) *Attorney, Agent, or Firm*—Garvey, Smith, Nehrbass & Doody, L.L.C.; Charles C. Garvey, Jr.; Brett A. North

(57) ABSTRACT

A method and apparatus for providing sanitized water in a bottled water dispenser uses a refrigeration system to cool the water and an ozone generating system to generate ozone for sanitizing the water. Ozone is generated and collected within an ozone generator housing. A blower transmits air to the housing, the air carrying the ozone through a flow line to an air diffuser that is positioned inside the reservoir of the water dispenser. A time deactivates the refrigeration system and at about the same time activates the ozone generator and the blower. The blower continues to pump air for a selected time period after the ozone generator is shut down, the water in the reservoir having been sanitized. This action dispenses any ozone odor. The pump then shuts off and the refrigeration system resumes operation of cooling the water in the reservoir.

36 Claims, 5 Drawing Sheets

METHOD AND APPARATUS FOR DISINFECTING A WATER COOLER RESERVOIR

CROSS-REFERENCE TO RELATED APPLICATIONS

This is a continuation-in-part of U.S. patent application Ser. No. 09/472,320, filed Dec. 23, 1999 now U.S. Pat. No. 6,289,690 which is a continuation-in-part of U.S. patent application Ser. No. 09/220,554, filed Dec. 23, 1998, now U.S. Pat. No. 6,085,540 all incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to bottled water dispensers, and more particularly to an improved bottled water dispenser for dispensing water that has been sanitized using ozone and more particularly to an improved method and apparatus for sanitizing a water cooler of the type having an inverted bottle for containing water with a neck portion of the bottle communicating with an open reservoir.

2. General Background of the Invention

One of the most common types of bottled water dispensers is a floor standing cabinet having an open top that receives a large inverted bottle. The bottle is typically of a plastic or glass material having a constricted neck. The bottle is turned upside down and placed on the top of the cabinet with the neck of the bottle extending into a water filled reservoir so that the water seeks its own level in the reservoir during use. As a user draws water from a spigot dispenser, the liquid level in the reservoir drops until it falls below the neck of the bottle at which time water flows from the bottle and bubbles enter the bottle until pressure has equalized.

These types of inverted bottle water dispensers are sold by a number of companies in the United States. Many are refrigerated.

One of the problems with bottled water dispensers that use an inverted bottle is that of cleansing the unit from time to time. Because the top is not air tight, it breathes so that bacteria can easily enter the reservoir over a period of time.

In addition to the problem of an open top, the five gallon bottles that are typically used in combination with a cabinet having an open reservoir are themselves a source of bacteria and germs. Most of these bottles are transported on trucks where the bottles are exposed to outside air. They are handled by operators that typically grab the bottle at the neck, the very part of the bottle that communicates with the open reservoir during use. Unfortunately, it is difficult to convince every person that handles these bottles to wash their hands frequently enough.

In order to properly sanitize such a water dispenser or cooler, the user must carefully clean the neck of the bottle prior to combining the bottle with the cabinet. Further, the user should drain and sanitize the reservoir from time to time. The cleansing of the reservoir in such a water dispenser is a time consuming project that is typically not done often enough.

The present invention provides an improved self sanitizing water dispenser apparatus as well as a method for generating ozone for cleaning the reservoir and the water contained within it.

BRIEF SUMMARY OF THE INVENTION

The present invention provides a self sanitizing bottled water dispenser that includes a cabinet having upper and lower end portions, the upper end portion of the cabinet having a cover with an opening for receiving and holding a bottle of water to be dispensed.

The bottle contains water to be dispensed, and provides a neck portion and a dispensing outlet portion.

A reservoir contained within the cabinet next to the upper end portion thereof contained water with a water service that communicates with a bottle neck during use. A refrigeration system cools the water within the reservoir. A diffuser ring emits bubbles into the reservoir, the diffuser ring being disposed within the reservoir at the lower end portion thereof and next to the reservoir wall so that bubbles emitted by the diffuser ring helps scrub the wall.

An ozone generator is supported within the housing. Air flow lines communicate with an air pump to carry ozone from the ozone generator housing to the diffuser ring. A blower generates air flow and a flow line connects the blower to the ozone generator housing.

A timer is provided for activating the ozone generator at a selected time and for a selected time interval. The timer initially deactivates the refrigeration system compressor while simultaneously activating the air pump. The timer activates the ozone generator after the air pump is activated.

The ozone generator is activated for a selected time interval (e.g. a few minutes). After the selected time interval, the ozone generator is shut off, but the air pump continues air flow for a time period of a few minutes in order to help disperse any odor of ozone. The air pump is then shut off and the refrigeration system compressor starts operation again to cool the water.

The diffuser ring is preferably positioned around the side of the reservoir at the bottom of the reservoir, close to the intersection of the reservoir bottom wall and reservoir side wall.

The diffuser ring can be preferably circular in shape, and having a composite construction that includes a porous core that is partially covered with a non-porous coating.

The reservoir preferably has a center portion and the diffuser ring has openings positioned to direct air away from the center portion of the reservoir.

The reservoir includes a generally vertical side wall and the diffuser ring is positioned to discharge bubbles against the side wall so that the side wall is scrubbed with ozone bubbles during use.

The ozone generator housing is comprised of an upper housing section, a lower housing section and a gasket positioned in between the upper and lower sections. An ozone generator is contained within the interior of the housing. Fittings on the housing enable air to flow into and out of the housing. A blower generates air flow to carry air into the ozone housing and from the ozone generator housing to the air diffuser. A HEPA filter at the air intake removes airborne microorganisms.

BRIEF DESCRIPTION OF THE DRAWINGS

For a further understanding of the nature, objects, and advantages of the present invention, reference should be made to the following detailed description, read in conjunction with the following drawings, wherein like reference numerals denote like elements and wherein.

DETAILED DESCRIPTION OF THE INVENTION

Figure 1:
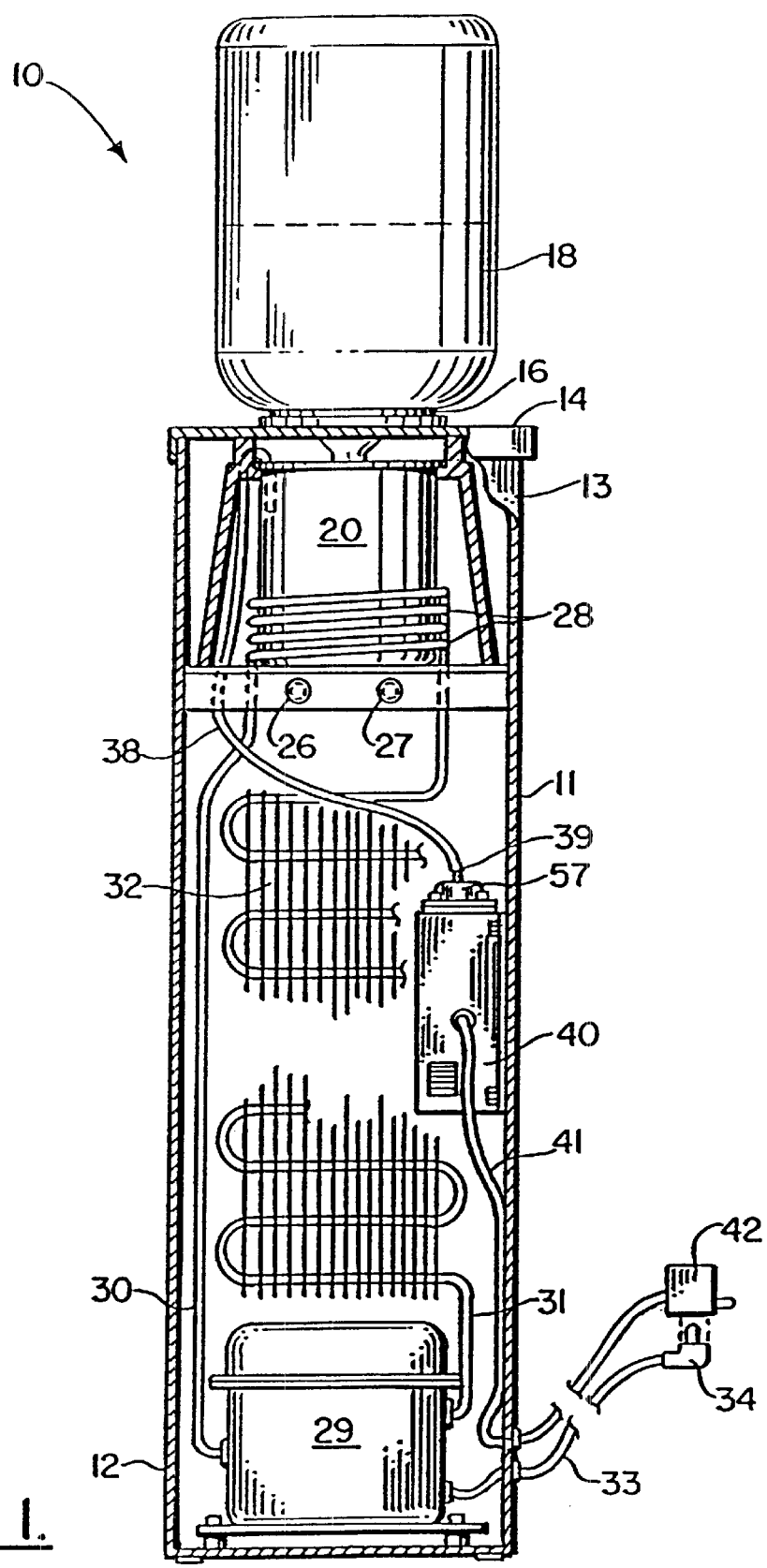
FIG. 1 is a sectional elevational view of the preferred embodiment of the apparatus of the present invention.
Figure 2:
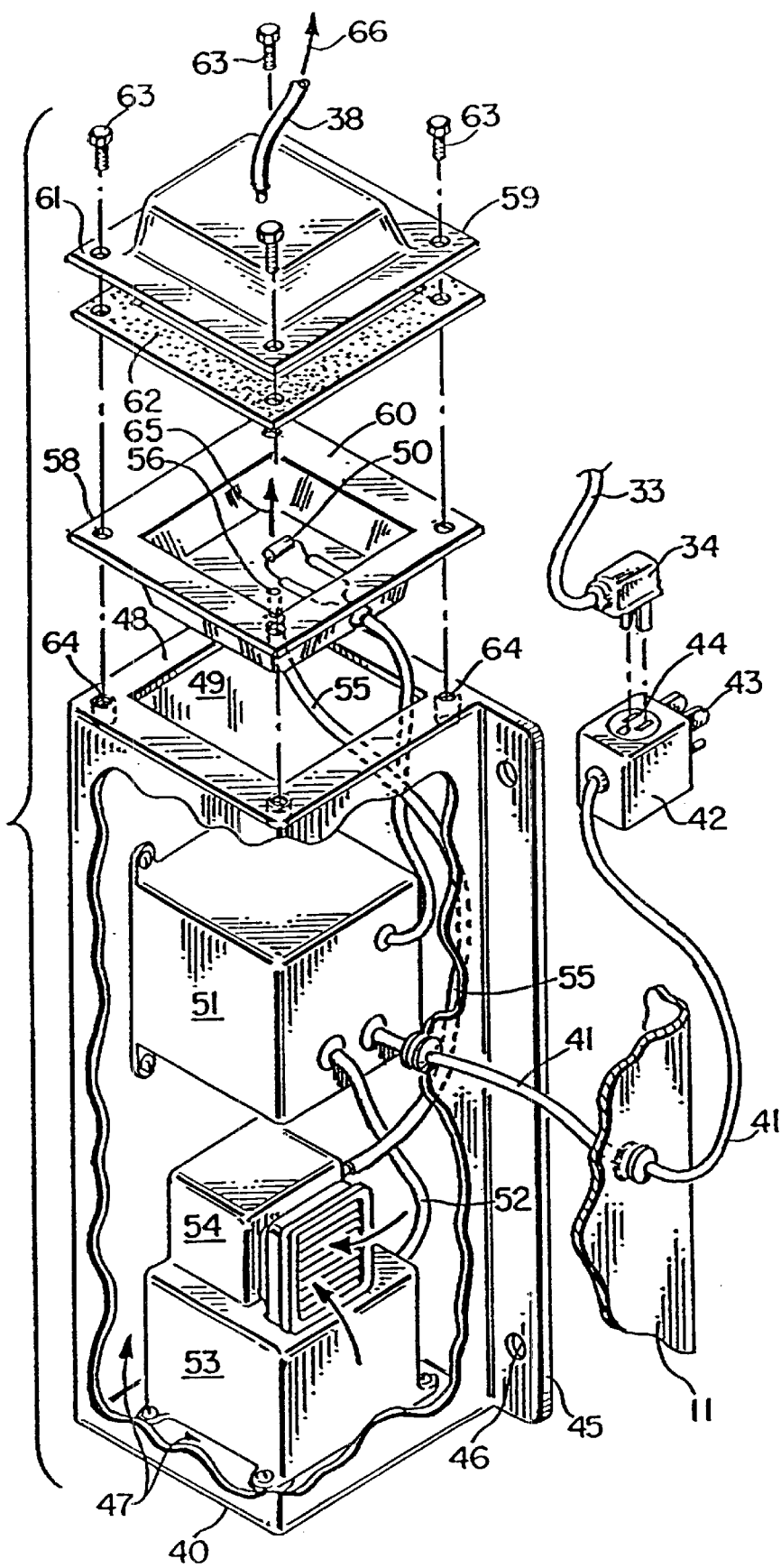
FIG. 2 is a partial perspective exploded view of the preferred embodiment of the apparatus of the present invention illustrating the ozone generator portion thereof.
Figure 3:
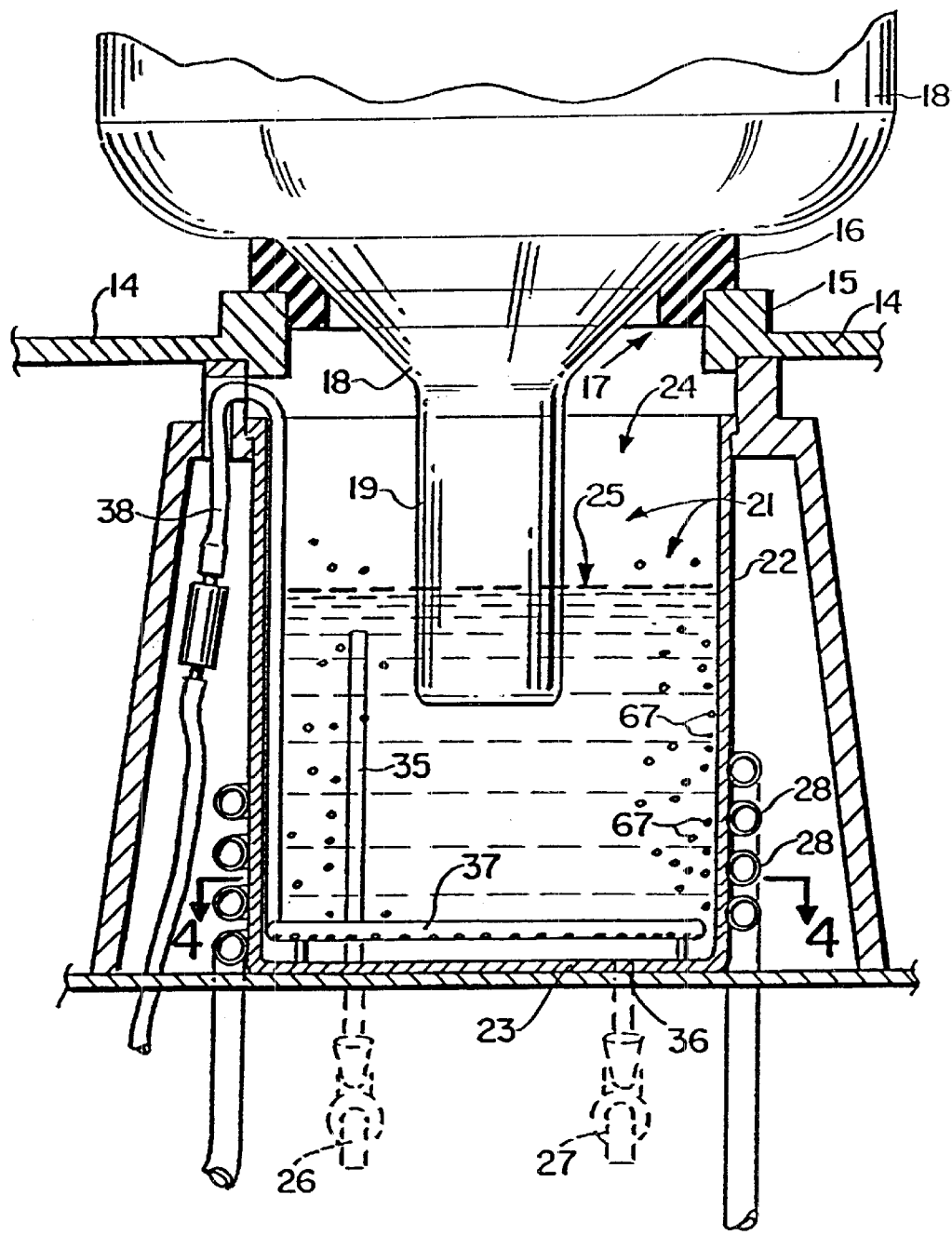
FIG. 3 is a partial sectional elevational view of the preferred embodiment of the apparatus of the present invention illustrating the reservoir, bottle, and ozone diffuser portions thereof.

FIGS. 1–3 show generally the preferred embodiment of the apparatus of the present invention designated by the numeral 10 in FIG. 1. Water dispenser 10 provides an improved apparatus that sanitizes the open reservoir from time to time with ozone. The apparatus 10 includes a cabinet 11 having a lower end portion 12 and an upper end portion 13. The upper end portion 13 carries a cover 14 having an opening 17.

The opening 17 provides an annular flange 15 and a gasket 16 that defines an interface with bottle 18. The bottle 18 is a commercially available bottle that is typically of a several gallon volume (e.g. five gallons). in the United States. The bottle 18 provides a constricted bottled neck 19 that is placed inside an open reservoir 20 as shown in FIGS. 1 and 3 during use. The bottle neck 19 has an opening for communicating with a reservoir 20 at the interior of the cabinet 11 that holds the water product to be dispensed and consumed. When the reservoir 21 is lowered during use, air bubbles enter the bottle and water replenishes the reservoir 20 until pressure equalizes.

The reservoir 20 has an interior 21 surrounded by reservoir sidewall 22 and reservoir bottom wall 23. The reservoir can be, for example, generally cylindrically shaped and of a stainless steel or plastic material. The reservoir 20 provides an open top for communicating with the neck 19 of bottle 18.

During use, reservoir 20 has a water surface 25 that fluctuates slightly as water is dispensed and then replenished by bottle 18. One or more spigots 26, 27 can be provided for withdrawing water contained in reservoir 20. In the embodiment shown in FIG. 3, for example, a left hand spigot 26 has a flow line 35 that extends up to and near the surface 25 of water contained in reservoir 20. The spigot 26 thus removes ambient temperature water from reservoir 20 that is not in close proximity to the cooling coils 28. The spigot 27 provides a port 36 for communicating with water contained in reservoir 20. Because the refrigeration coils 28 are positioned at the lower end of reservoir 20, the spigot 26 withdraws cool water. As a practical matter, a water dispenser apparatus 10 could provide either ambient temperature water, cold water or heated water if, for example, a flow line 35 were to be provided with a heating element.

For cooling the water at the lower end portion of the reservoir 20, a cooling system that includes a compressor 29 can be provided. The refrigeration system includes flow lines 30, 31 in combination with compressor 29 to transmit cooling fluid to coils 28 and then to heat exchanger 32 as part of a system for cooling water in reservoir 20. Power to the apparatus 10 is provided by electrical lines, including an electrical line 33 provided with plug 34. The plug 34 can be fitted to controller 42 having receptacle 44 and plug 43 as shown in FIG. 2. In this fashion, electricity can be selectively routed to the compressor 29 via electrical line 33 or to the housing 40 containing ozone generator 50 using electrical line 41. This feature enables the compressor to be deactivated when the ozone generator 50 is to be used to transmit ozone to reservoir 20 for cleaning water contained in it and for scrubbing the inside walls of reservoir 20.

In FIGS. 1 and 2, the housing 40 includes an ozone generator 50 that generates ozone for cleaning water contained in reservoir 20. Additionally, the housing 40 contains a motor drive 53 and blower 54 that move air through an ozone generator housing 57 to diffuser 37. Air line 38 communicates between ozone generator housing 57 and ozone diffuser 37. Fitting 39 provides a connection for attaching the exit air flow line 38 to ozone generator 57 as shown in FIGS. 1 and 2.

Housing 40 can be provided with flanges 45 and openings 46 for enabling the housing 40 to be retrofitted to an existing cabinet 11 by bolting the housing 40 to the cabinet 11 as shown in FIG. 1.

In FIG. 2, housing 40 includes a lower end portion 47 and an upper end portion 48. The upper end portion 48 provides an opening 49 to which ozone generator housing 57 can be affixed. An ozone generator 50 is contained within the housing 57 as shown in FIG. 2. Housing 57 includes a lower housing section 58 and an upper housing section 59. Flange 60 of lower housing section 58 and flange 61 of upper housing section 59 each engage gasket 62 upon assembly.

Bolted connections 63 can be used for attaching the housing 57 to housing 40 at internally threaded openings 64 on housing 40 as shown in FIGS. 1 and 2. During use, the controller 42 normally deactivates the ozone generator 50 during normal hours when the users are dispensing water from the apparatus 10. Because the ozone used to disinfect reservoir 20 has a distinctive smell, it is preferable to clean the water contained in reservoir 20, to clean the inside walls of reservoir 20 and the bottle neck 19, at a selected time. The controller 42 could be activated for example during early morning hours (e.g. 3:00 a.m.–4:00 a.m.) and can be a commercially available controller that activates transformer 51 and motor drive 53 only after compressor 29 and the refrigeration system have been deactivated by the controller 42. This accomplished by shutting off the flow of electricity to plug 34 and electric line 33 that supply electricity to compressor 29.

Figure 4:
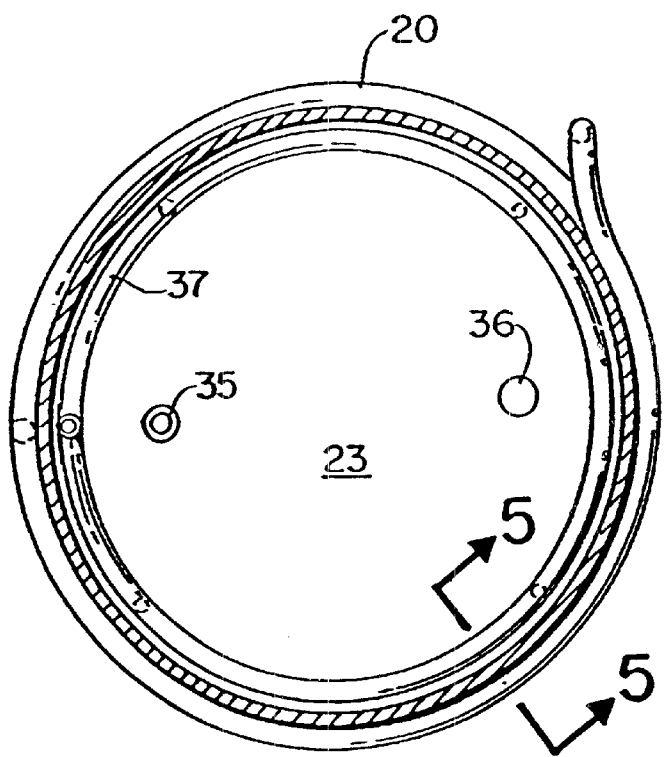
FIG. 4 is a fragmentary view of the preferred embodiment of the apparatus of the present invention illustrating the open reservoir and ozone diffuser.

After electricity is disconnected from compressor 29, transformer 51 and motor drive 53 are activated. The transformer 51 produces electricity with a very high voltage at ozone generator 50 for generating ozone within the confines of ozone generator housing 57. As this ozone is generated within housing 57, air is pumped with air pump 54 into inlet flow line 55 and via opening 56 into the interior of housing 57. HEPA filter 71 removes airborne microorganism before they can enter air pump 54 and flow line 55. This positive flow of air pressure into housing 57 causes a simultaneous discharge of air through fitting 39 into air flow line 38. The air flow line 38 then carries air to diffuser 37 or 37A (FIGS. 7–14) that is contained at the bottom at the side wall of reservoir 20. The specific placement of diffuser 37 or 37A and the flow of air therefrom containing ozone is shown more particularly in FIGS. 4–14. In FIG. 4, a top view of the reservoir shows that the diffuser 37 or 37A preferably extends 360 degrees about the periphery of reservoir 20 and at the sidewall 22 thereof. This is preferable because ozone bubbles 67 are used to scrub the side wall 22 at the inside surface as shown in FIG. 3.

Figure 6:
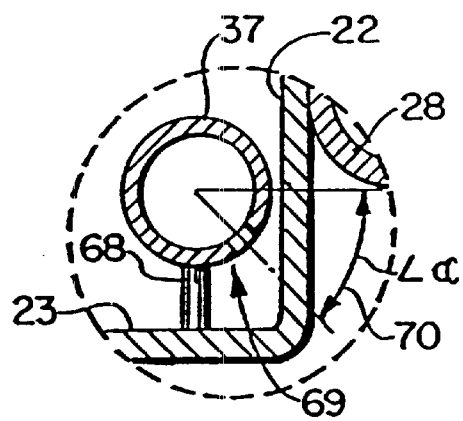
FIG. 6 is a fragmentary elevational view illustrating the ozone diffuser and its position in relation to the reservoir.
Figure 5:
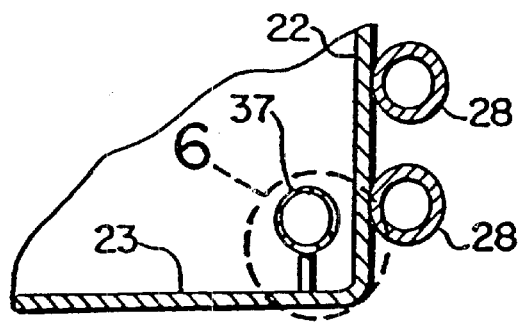
FIG. 5 is a sectional view taken along lines 5—5 of FIG. 4.

The diffuser 37 or 37A can be is supported by a plurality of feet 68 that extend between the diffuser 37 or 37A and a bottom wall 23 of reservoir 20. Openings 69 in diffuser 37 are directed at an angle with respect to the bottom wall 23 and side wall 22 of reservoir 20 as shown in FIG. 6. An angle 70 of preferably about 45 degrees defines the orientation of openings 69 with respect to the walls 22, 23. This configuration of the openings 69 relative to the walls 22, 23 ensures that bubbles 67 will be discharged outwardly toward side wall 22, to maximize the scrubbing effect at the interior wall 22 of reservoir 20. This scrubbing action using ozone bubbles 67 cleans the sidewall 22 and produces a rolling flow of water within reservoir 20. The bubbles 67 will strike the surface 25 of the reservoir 20 and flow inwardly. Such a circulation ensures that all of the water within the reservoir 20 is cleaned. Further, directing the bubbles from diffuser 37 outwardly toward wall 22 ensures that none of the bubbles 67 will enter bottle 18 via neck 19 which would cause the device to overflow.

Figure 7:
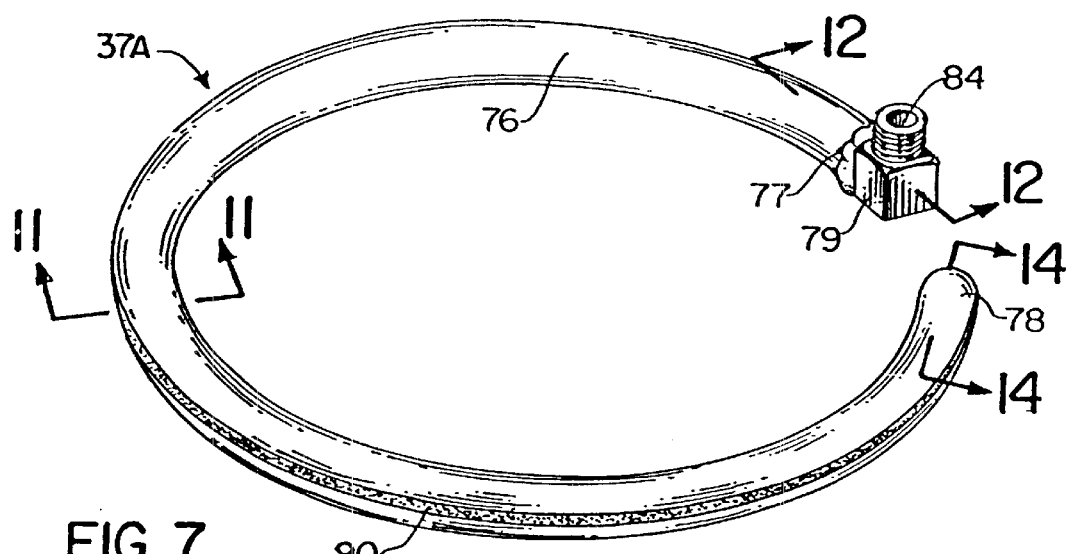
FIG. 7 is a fragmentary view of the preferred embodiment of the apparatus of the present invention illustrating an alternate construction for the diffuser.
Figure 8:
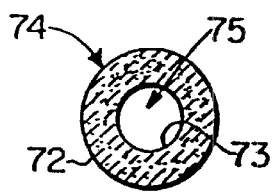
FIG. 8 is a fragmentary, sectional view of the diffuser of FIG. 7 showing the porous body portion thereof.
Figure 9:
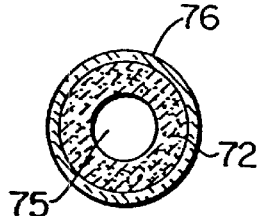
FIG. 9 is a fragmentary, sectional view of the diffuser of FIG. 7 prior to a grinding of part of the non-porous surface therefrom.
Figure 10:
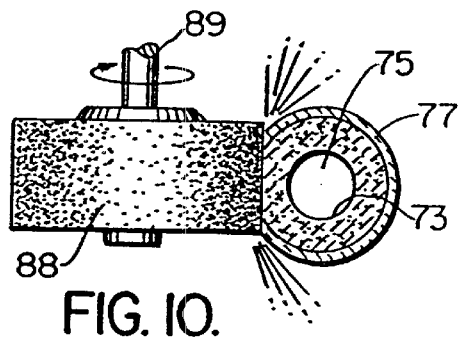
FIG. 10 is a schematic, fragmentary view illustrating the diffuser of FIG. 7 during construction.

FIGS. 7–14 show an alternate construction of the diffuser, wherein the diffuser is designated generally by the numeral 37A. Diffuser 37A has a porous body 72 as shown in FIG. 8 that begins with a cylindrically shaped hollow cross section. Porous body 72 can be a food grade porous ceramic material. The porous body 72 is generally C shaped as shown in FIG. 7, but provides the cross section shown in FIG. 11. FIGS. 8, 9 and 10 show the method of construction of the diffuser 37A which begins with porous body 72. In FIG. 8, porous body 72 has an inner surface 73 that surrounds hollow bore 75 and an outer surface 74. In FIG. 9, a non-porous coating (e.g. food grade non-porous epoxy that can e fired) is provided on porous body 72 to provide an outer coating 76 that is substantially impervious to the escape of air. In FIG. 10, rotary grinding tool 88 having rotary shaft 89 is used to grind away part of the non-porous coating 76 to provide an exposed face 90 (see FIGS. 10 and 11).

Figure 11:
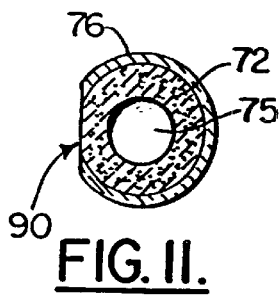
FIG. 11 is a sectional view taken along lines 11—11 of FIG. 7.
Figure 13:
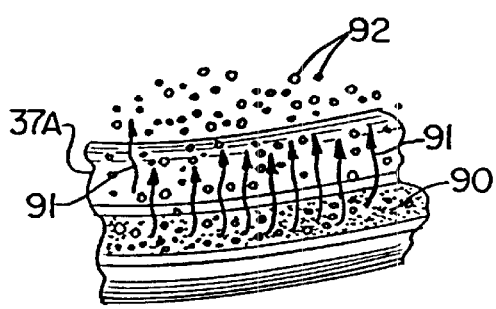
FIG. 13 is a fragmentary, perspective view illustrating the diffuser of FIG. 7.

When air is injected through inlet elbow fitting 79, the air enters hollow bore 75 and then diffuses through porous body 72. Coating 76 prevents the escape of air so that air can only escape through exposed face 90. Exposed face 90 is positioned on the outer portion of C shaped diffuser 37A as shown in FIGS. 7 and 11. An enlarged view of this exposed face 90 is shown in FIG. 13 with arrows 91 indicating the escape of bubbles 92.

Figure 12:
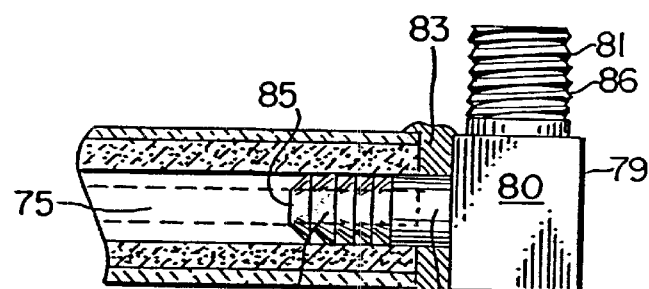
FIG. 12 is a sectional view taken along lines 12—12 of FIG. 7.

The inlet elbow fitting 79 has a body 80 with two legs 81, 82 extending therefrom. Coupling material 83 such as food grade epoxy can be used to join the combination of porous body 72 and its coating 76 to inlet elbow fitting 79. Each of the legs 81, 82 provides an internal hollow flow bore, said bores 84 and 85 intersecting at body 80 so that air flow can proceed from bore 84 of leg 81 to bore 85 of leg 82. The leg 81 can provide external threads 86 so that it can be connected to an influent air flow line 38. Other connectors could be used on leg 81 such as a stab fitting type connection, clamp connection or the like. Elbow fitting 79 at leg 82 can provide similar connective material for forming a connection with porous body 72 at its inner surface 73. This connective structure on leg 82 can be a stab fitting type connection as shown in FIG. 12, external threads, or like connective structure.

Figure 14:
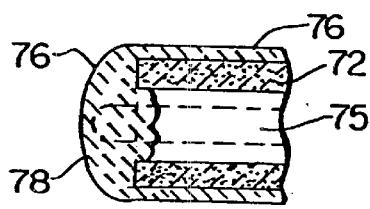
FIG. 14 is a sectional view taken along lines 14—14 of FIG. 7.

In FIG. 7, the diffuser 37A has closed end portion 78 and end portion 79 that receives elbow fitting 79. Closed end 78 can be closed by using the same material that constitutes coating 76 as shown in FIG. 14.

The following table lists the parts numbers and parts descriptions as used herein and in the drawings attached hereto.

| PARTS LIST | |
| --- | --- |
| Part Number | Description |
| 10 | water dispenser |
| 11 | cabinet |
| 12 | lower end |
| 13 | upper end |
| 14 | cover |
| 15 | annular flange |
| 16 | gasket |
| 17 | opening |
| 18 | bottle |
| 19 | bottle neck |
| 20 | reservoir |
| 21 | interior |
| 22 | reservoir side wall |
| 23 | reservoir bottom wall |
| 24 | open top |
| 25 | water surface |
| 26 | spigot |
| 27 | spigot |
| 28 | refrigeration coil |
| 29 | compressor |
| 30 | flow line |
| 31 | flow line |
| 32 | heat exchanger |
| 33 | electrical line |
| 34 | plug |
| 35 | flow line |
| 36 | outlet port |
| 37 | diffuser |
| 37A | diffuser |
| 38 | air line |
| 39 | fitting |
| 40 | housing |
| 41 | electrical line |
| 42 | controller |
| 43 | plug |
| 44 | receptacle |
| 45 | flange |
| 46 | opening |
| 47 | lower end |
| 48 | upper end |
| 49 | opening |

-continued

PARTS LIST

| Part Number | Description |
|---|---|
| 50 | ozone generator |
| 51 | transformer |
| 52 | electrical line |
| 53 | motor |
| 54 | blower |
| 55 | air line |
| 56 | air inlet |
| 57 | ozone generator housing |
| 58 | lower housing section |
| 59 | upper housing section |
| 60 | flange |
| 61 | flange |
| 62 | gasket |
| 63 | bolted connection |
| 64 | internally threaded opening |
| 65 | arrow |
| 66 | arrow |
| 67 | bubble |
| 68 | foot |
| 69 | opening |
| 70 | angle |
| 71 | filter |
| 72 | porous body |
| 73 | inner surface |
| 74 | outer surface |
| 75 | hollow bore |
| 76 | non-porous coating |
| 77 | end portion |
| 78 | end portion |
| 79 | elbow fitting |
| 80 | body |
| 81 | leg |
| 82 | leg |
| 83 | coupling material |
| 84 | bore |
| 85 | bore |
| 86 | external threads |
| 87 | stab fitting |
| 88 | grinding tool |
| 89 | shaft |
| 90 | exposed face |
| 91 | arrow |
| 92 | bubble |

The foregoing embodiments are presented by way of example only; the scope of the present invention is to be limited only by the following claims.

What is claimed is:

1. A water dispenser, comprising:
   a) a cabinet having upper and lower end portions;
   b) the upper end portion of the cabinet having a cover with an opening for receiving and holding a bottle of water to be dispensed that has a bottle neck with a bottle opening;
   c) reservoir contained within the cabinet, the reservoir containing water with a water surface;
   d) means for replenishing the reservoir;
   e) a refrigeration system for cooling water within the reservoir;
   f) a diffuser for emitting bubbles into the reservoir, said diffuser being disposed within the reservoir and next to the reservoir wall but not under the bottle opening so that bubbles emitted by the diffuser help scrub the wall but do not enter the bottle, said diffuser comprising a porous body that is partially covered by a non-porous coating;
   g) an ozone generator housing supported next to the housing, said housing having an ozone generator inside the housing and air flow lines for transmitting air to and from the housing interior;
   h) a timer that activates the ozone generator at a selected time and for a selected time interval and then deactivates the ozone generator after the selected time interval expires, said timer activating said ozone generator and deactivating the refrigeration system at about the same time during said selected time interval.

2. The water dispenser of claim 1 wherein the diffuser is positioned around the side of the reservoir at the bottom of the reservoir.

3. The water dispenser of claim 1 wherein the diffuser is generally circular.

4. The water dispenser of claim 1 wherein the reservoir has a center portion and the diffuser has openings positioned to direct air emissions from the center portion of the reservoir.

5. The water dispenser of claim 1 wherein the reservoir includes a generally vertical sidewall and the diffuser is positioned to discharge bubbles against the sidewall so that the sidewall is scrubbed with ozone bubbles during use.

6. The water dispenser of claim 1 wherein the ozone generator generates sufficient ozone to sterilize the water in the reservoir by bubbling air upwardly a distance of just a few inches.

7. The water dispenser of claim 1 further comprising means for enabling the ozone generator to continue to generate air flow into said ozone generator housing and air diffuser via first and second air flow lines for selected time after the ozone generator has been deactivated.

8. The water dispenser of claim 1 further comprising a transformer for generating high voltage electricity for the ozone generator.

9. The water dispenser of claim 1 wherein the replenishing means includes a central water inlet and the diffuser is spaced horizontally away from the water inlet.

10. A bottled water dispenser, comprising:
    a) a cabinet having upper and lower end portions;
    b) the upper end portion of the cabinet having a cover with an opening for receiving and holding a bottle of water to be dispensed;
    c) a bottle containing water to be dispensed, said bottle having a neck portion and a dispensing outlet portion;
    d) reservoir having reservoir walls and contained within the cabinet, the reservoir containing water with a water surface that communicates with the bottle neck during use;
    e) a refrigeration system for cooling water within the reservoir;
    f) a porous ceramic diffuser for emitting bubbles into the reservoir, said diffuser being disposed within the reservoir next to the reservoir wall so that bubbles emitted by the diffuser help scrub the reservoir wall, said diffuser comprising in part a porous ceramic body;
    g) an ozone generator housing supported next to the housing, said housing having an ozone generator inside the housing and air flow lines for transmitting air to and from the housing interior;
    h) a blower for generating air flow;
    i) a first air flow line connecting the blower and the housing interior;
    j) a second air flow line connecting the housing interior with the diffuser; and
    k) a timer that activates the ozone generator at a selected time and deactivates the ozone generator after a selected time interval.

11. The water dispenser of claim 10 wherein the diffuser is positioned around the side of the reservoir at the bottom of the reservoir.

12. The water dispenser of claim 10 wherein the diffuser is generally circular.

13. The water dispenser of claim 10 wherein the reservoir has a center portion and the diffuser has openings positioned to direct air emissions from the center portion of the reservoir.

14. The water dispenser of claim 10 wherein the reservoir includes a generally vertical sidewall and the diffuser is positioned to discharge bubbles against the sidewall so that the sidewall is scrubbed with ozone bubbles during use.

15. The water dispenser of claim 10 wherein the ozone generator generates sufficient ozone to sterilize the water in the reservoir by bubbling air upwardly a distance of just a few inches.

16. The water dispenser of claim 10 further comprising means for enabling the ozone generator to continue to generate air flow into said ozone generator housing and air diffuser via first and second air flow lines for selected time after the ozone generator has been deactivated.

17. The water dispenser of claim 10 further comprising a transformer for generating high voltage electricity for the ozone generator.

18. The water dispenser of claim 10 wherein the replenishing means includes a central water inlet and the diffuser is spaced horizontally away from the water inlet.

19. A bottled water dispenser, comprising:
   a) a cabinet having upper and lower end portions;
   b) a reservoir contained within the cabinet, the reservoir having bottom and side portions and containing water with a water surface the water depth between the water surface and reservoir bottom portion being less than about twelve inches;
   c) a refrigeration system for cooling water within the reservoir;
   d) a diffuser for emitting bubbles into the reservoir, said diffuser being disposed within the reservoir at the lower end portion thereof and next to the reservoir wall so that bubbles emitted by the diffuser help scrub the wall, the bubbles traveling upwardly a distance of less than about twelve inches;
   e) an ozone generator housing supported next to the housing, said housing having an ozone generator inside the housing and air flow lines for transmitting air to and from the housing interior;
   f) a blower for generating air flow;
   g) a first air flow line connecting the blower and the housing interior;
   h) a second air flow line connecting the housing interior with the diffuser.

20. The water dispenser of claim 19 wherein the diffuser is positioned around the side of the reservoir at the bottom of the reservoir.

21. The water dispenser of claim 19 wherein the diffuser is generally circular.

22. The water dispenser of claim 19 wherein the reservoir has a center portion and the diffuser has openings positioned to direct air emissions from the center portion of the reservoir.

23. The water dispenser of claim 19 wherein the reservoir includes a generally vertical sidewall and the diffuser is positioned to discharge bubbles against the sidewall so that the sidewall is scrubbed with ozone bubbles during use.

24. The water dispenser of claim 19 wherein the ozone generator generates sufficient ozone to sterilize the water in the reservoir by bubbling air upwardly a distance of just a few inches.

25. The water dispenser of claim 19 further comprising means for enabling the ozone generator to continue to generate air flow into said ozone generator housing and air diffuser via first and second air flow lines for selected time after the ozone generator has been deactivated.

26. The water dispenser of claim 19 further comprising a transformer for generating high voltage electricity for the ozone generator.

27. The water dispenser of claim 19 wherein the replenishing means includes a central water inlet and the diffuser is spaced horizontally away from the water inlet.

28. A method of sanitizing a bottled water dispenser having a cabinet with a reservoir and a refrigeration system that cools the reservoir, and wherein a water supply replenishes the reservoir as water is dispensed from the reservoir comprising the steps of:
   a) using the refrigeration system to cool the water in the reservoir;
   b) generating ozone with an ozone generator;
   c) collecting the generated ozone inside of an ozone generator housing;
   d) providing an ozone diffuser inside the reservoir that is comprised of a porous ceramic body, wherein the diffuser directs bubbles away from the center of the reservoir to scrub the reservoir wall;
   e) transmitting ozone from the ozone generator housing to the diffuser so that bubbles rise upwardly in the reservoir a distance of less than twelve inches.

29. The method of claim 28 wherein the water supply is a bottle that is inverted and connected to the reservoir, and further comprising the step of spacing the diffuser from the bottle neck so that ozone from the diffuser does not enter the bottle.

30. The method of claim 28 wherein the step "g" precedes steps "b" through "f".

31. The method of claim 28 wherein a controller activates the ozone generator and deactivates the refrigeration system.

32. The method of claim 28 wherein the refrigeration system is deactivated before the ozone generator is activated.

33. The method of claim 28 wherein the refrigeration system is deactivated and the blower activated at about the same time.

34. The method of claim 28 further comprising the steps of deactivating the blower and activating the refrigeration system after step "i".

35. The method of claim 28 wherein bubbles rise upwardly a distance of between about two and ten inches.

36. The method of claim 23 wherein bubbles rise upwardly a distance of between about four and eight inches.

* * * * *